United States Patent
Chang et al.

(10) Patent No.: US 9,733,683 B2
(45) Date of Patent: Aug. 15, 2017

(54) MOTHERBOARD AND ELECTRONIC DEVICE USING THE SAME

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Gui Chang, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

(*) Notice: Subject to any disclaimer, the term of this patent is extended or adjusted under 35 U.S.C. 154(b) by 155 days.

(21) Appl. No.: 14/736,823

(22) Filed: Jun. 11, 2015

(65) Prior Publication Data

US 2016/0211656 A1 Jul. 21, 2016

(30) Foreign Application Priority Data

Jan. 21, 2015 (CN) .......................... 2015 1 0029588

(51) Int. Cl.
*G06F 1/26* (2006.01)
*G06F 1/28* (2006.01)

(52) U.S. Cl.
CPC . *G06F 1/26* (2013.01); *G06F 1/28* (2013.01)

(58) Field of Classification Search
CPC ................................................ G06F 1/26–1/28
See application file for complete search history.

(56) References Cited

U.S. PATENT DOCUMENTS

| | | | |
|---|---|---|---|
| 8,842,110 B2* | 9/2014 | Kim | G09G 3/3233 345/211 |
| 2009/0175070 A1* | 7/2009 | Houston | H01L 27/0207 365/154 |
| 2012/0161635 A1* | 6/2012 | Kim | G09G 3/3233 315/120 |

* cited by examiner

*Primary Examiner* — Stephen W Jackson
*Assistant Examiner* — Christopher Clark
(74) *Attorney, Agent, or Firm* — Steven Reiss

(57) ABSTRACT

A motherboard includes a power module, a display module, a control module, and a protection module. The protection module is coupled to the power module, the display module, and the control module. The control module is capable of outputting a first control signal to control the protection module to connect the power module to the display module to be powered by the power module or disconnect the power module from the display module.

12 Claims, 1 Drawing Sheet

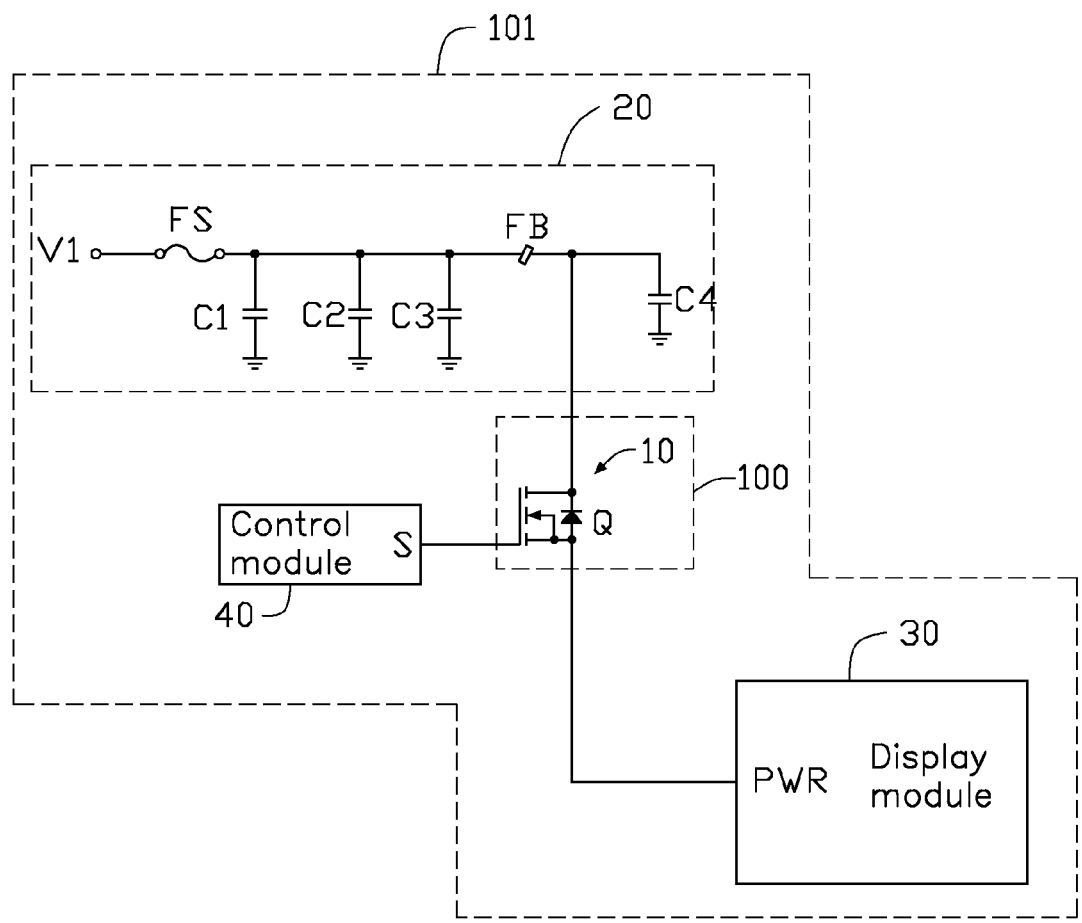

MOTHERBOARD AND ELECTRONIC DEVICE USING THE SAME

FIELD

The subject matter herein generally relates to a motherboard and an electronic device using the motherboard.

BACKGROUND

Current leakage through connectors may damage electronic devices.

BRIEF DESCRIPTION OF THE DRAWING

Implementations of the present technology will now be described, by way of example only, with reference to the attached figure.

The FIGURE is a circuit diagram of an embodiment of a motherboard and an electronic device using the motherboard.

DETAILED DESCRIPTION

Numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series and the like.

The FIGURE shows an electronic device 200 which comprises a motherboard 101. The motherboard 101 can comprise a protection circuit 100, a power module 20, a display module 30, and a control module 40. The protection circuit 100 can comprise a protection module 10. The protection module 10 is coupled to the power module 20 and the display module 30. The protection module 10 is also coupled to the control module 40. The control module 40 outputs a first control signal corresponding to a working state of the electronic device 200. The electronic device 200 can be a computer.

In the embodiment, the power module 20 can comprise a power terminal V1, a fuse FS, capacitors C1-C4, and a ferrite bead FB. The protection module 10 can comprise a field effect tube (FET) Q. A grid of the FET Q is coupled to a signal terminal S of the control module 40. A source of the FET Q is coupled to a power terminal PWR of the display module 30. A drain of the FET Q is coupled to the power terminal V1 through the ferrite bead FB and the fuse FS in that order. The drain of the FET Q is coupled to ground through the capacitor C4. A node between the ferrite bead FB and the fuse FS is coupled to ground through the capacitor C1. The capacitor C2 and the capacitor C3 are coupled in parallel with the capacitor C1.

In the embodiment, the control module 40 can be a platform controller of the computer. The platform controller outputs a second control signal which controls the computer to enter or exit a standby (S3) state through the signal terminal S. The fuse FS in the embodiment is used to prevent short circuits. The ferrite bead FB in the embodiment is used to restrain circuit noises.

In the embodiment, the FET Q is an n-channel metal oxide semiconductor FET. In the specification of a power management for computers, the second control signal which controls the computer to enter or exit the S3 state changes from high-level to low level earlier than other control signals which can control the computer to suspend (S4) or to be powered off (S5).

When the computer is not in the states S3, S4 or S5, the first control signal is at a high-level, such as logic 1. The grid of the FET Q is at a high-level and the drain of the FET Q is coupled to the source of the FET Q. The protection module 10 connects the power module 20 to the display module 30. The power terminal V1 supplies a voltage of +3V to the power terminal PWR of the display module 30. The power module 20 supplies power for the display module 30.

When the computer is in one of the states S3, S4 or S5, the first control signal is at a low-level, such as logic 0. The grid of the FET Q is at a low-level and the drain of the FET Q is disconnected from the source of the FET Q. The protection module 10 disconnects the power module 20 from the display module 30. The power terminal V1 cannot supply power to the display module 30.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A motherboard comprising:
   a power module, wherein the power module comprises a power terminal, a fuse, a first capacitor, a second capacitor, a third capacitor, a fourth capacitor, and a ferrite bead, the power terminal of the power module, the fuse, the ferrite bead, and the fourth capacitor are connected in that order, a node between the ferrite bead and the fuse is coupled to ground through the first capacitor, the second capacitor and the third capacitor coupled in parallel;
   a display module;
   a control module; and
   a protect module coupled to the power module, the display module, and the control module;
   wherein the control module is configured to output a first control signal to the protect module; and
   the protect module is configured to connect the power module to the display module or disconnect the power module from the display module upon receipt of the first control signal.

2. The motherboard as claim 1, wherein the protect module comprises a field effect transistor (FET), a gate of the FET is coupled to the control module to receive the first control signal, a source of the FET is coupled to a power terminal of the display module, a drain of the FET is coupled to the power module.

3. The motherboard as claim 2, wherein the FET is n-channel metal oxide semiconductor FET.

4. The motherboard as claim 2, wherein the drain of the FET is coupled to a node between the ferrite bead and the fourth capacitor.

5. A motherboard as claim 1, wherein the control module is capable of outputting a second control signal to control a computer to enter or quit a standby state.

6. A motherboard as claim 1, wherein the control module is a platform controller.

7. An electronic device, comprising:
a motherboard, comprising:
a power module, wherein the power module comprises a power terminal, a fuse, a first capacitor, a second capacitor, a third capacitor, a fourth capacitor, and a ferrite bead, the power terminal of the power module, the fuse, the ferrite bead, and the fourth capacitor are connected in that order, a node between the ferrite bead and the fuse is coupled to ground through the first capacitor, the second capacitor and the third capacitor coupled in parallel;
a display module;
a control module, and
a protect module, wherein the protect module is coupled to the power module, the display module, and the control module, the control module is configured to output a first control signal to the protect module, the protect module is configured to connect the power module to the display module or disconnect the power module from the display module upon receipt of the first control signal.

8. The electronic device as claim 7, wherein the protect module comprises a FET, a gate of the FET is coupled to the control module to receive the first control signal, a source of the FET is coupled to a power terminal of the display module, a drain of the FET is coupled to the power module.

9. The electronic device as claim 8, wherein the FET is n-channel metal oxide semiconductor FET.

10. The electronic device as claim 9, wherein the drain of the FET is coupled to a node between the ferrite bead and the fourth capacitor.

11. The electronic device as claim 7, wherein the control module is capable of outputting a second control signal to control a computer to enter or quit a standby state.

12. The electronic device as claim 7, wherein the control module is a platform controller.

* * * * *